United States Patent [19]

Collins

[11] Patent Number: 5,475,903
[45] Date of Patent: Dec. 19, 1995

[54] COMPOSITE NONWOVEN FABRIC AND METHOD

[75] Inventor: Loren M. Collins, N. Myrtle Beach, S.C.

[73] Assignee: American Nonwovens Corporation, Columbus, Mich.

[21] Appl. No.: 308,430

[22] Filed: Sep. 19, 1994

[51] Int. Cl.⁶ .................................. D04H 1/46; B32B 5/06
[52] U.S. Cl. .................................. 28/104; 28/107; 28/112; 428/233; 162/115
[58] Field of Search .......................... 28/104, 107, 108, 28/112, 158; 428/233, 234; 162/115

[56] References Cited

U.S. PATENT DOCUMENTS

| | | | |
|---|---|---|---|
| 3,620,903 | 11/1971 | Bunting, Jr. et al. | 162/115 X |
| 4,109,353 | 8/1978 | Mitchell et al. | 28/104 |
| 4,199,644 | 4/1980 | Platt | 28/107 X |
| 4,416,936 | 11/1983 | Erickson et al. | 28/107 X |
| 4,775,579 | 10/1988 | Hagy et al. | 28/104 X |
| 4,780,359 | 10/1988 | Trask et al. | 28/107 X |
| 4,808,467 | 2/1989 | Suskind et al. | 28/104 X |
| 4,902,564 | 2/1990 | Isreal et al. | 28/104 X |
| 4,931,355 | 6/1990 | Radwanski et al. | 28/104 X |
| 5,389,202 | 2/1995 | Everhart et al. | 28/104 X |

*Primary Examiner*—John J. Calvert
*Attorney, Agent, or Firm*—Ralph Bailey

[57] ABSTRACT

A composite nonwoven fabric and method for making the same includes subjecting a carded web to the action of a cross lapper (B) and then drafting the cross-lapped web by passing the same through a web drafter (C) utilizing a series of wire wound rolls of progressively increased speed. A web of substantially unbonded polymeric fibers is layed from a roll (D) forming a composite web by hydroentanglement utilizing a series of spun bonding steps resulting in a composite web of substantial strength comparison in the machine direction and in cross direction and possessing the characteristics of fabric suitable for use in hospital applications such as surgical gowns.

7 Claims, 4 Drawing Sheets

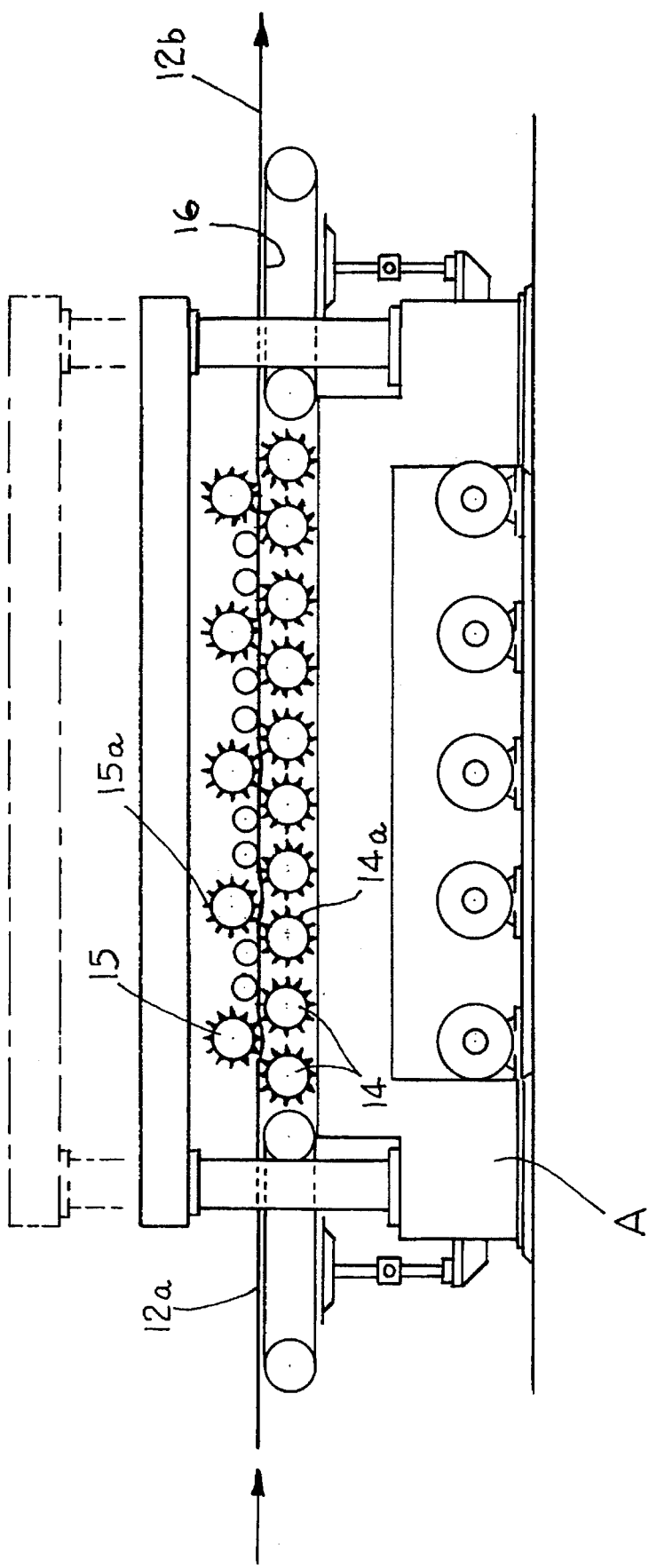

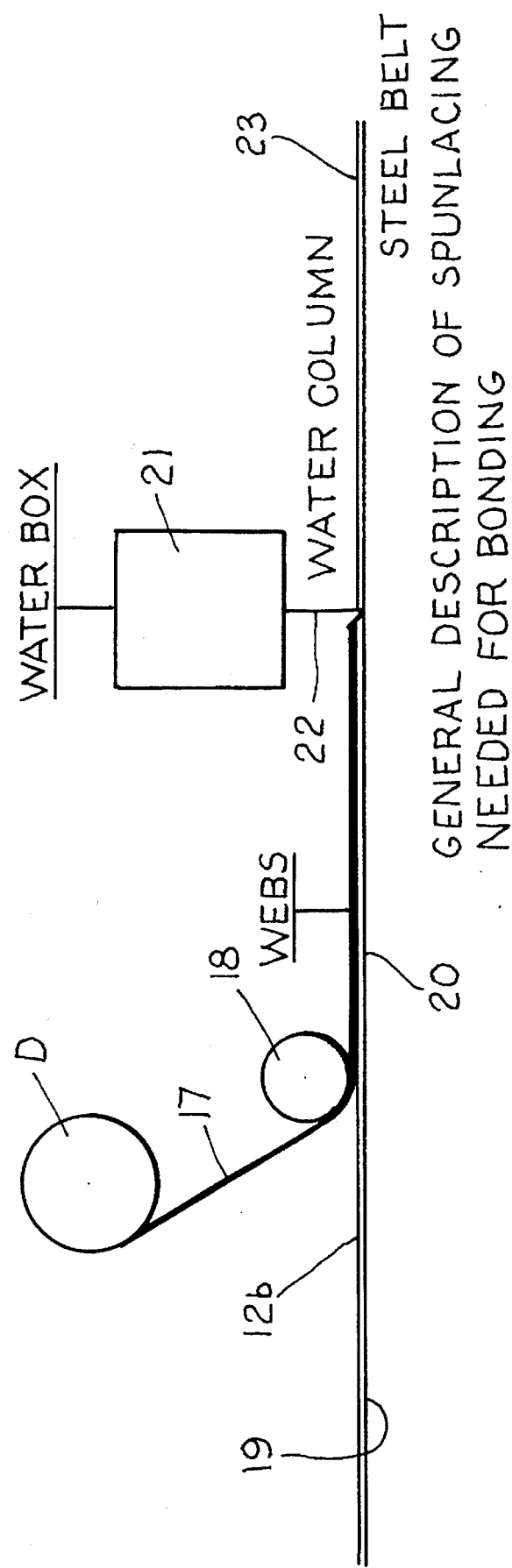

COMPOSITE NONWOVEN FABRIC AND METHOD

BACKGROUND OF THE INVENTION

This invention relates to a hydroentangled nonwoven fabric having comparable strength in the machine direction and in the cross direction and having high absorbency characteristics as well as drape and hand making it suitable for use in hospital gowns and the like.

Prior fabrics possessing characteristics of absorbency, drape and hand suitable for hospital use often exhibit a considerable disparity in tensile strengths as between the machine direction and the cross direction. This disparity causes difficulties in attaching sleeves to the body portion of a gown made of the same fabric by means of standard sewing operations often requiring an additional step. Since considerable tensile strength is required in the cross direction it has heretofore been necessary to construct relatively heavy nonwoven fabrics in order to produce desirable strength characteristics. Accordingly, it is an object of this invention to provide a lighter fabric which presents sufficient tensile strength in both the machine direction and the cross direction while at the same time providing suitable characteristics for use in hospitals and the like such as in hospital gowns, The prior art includes the provision of nonwoven fabrics having balanced strength properties in both the machine and cross directions which have been hydroentangled with essentially balanced high fire retardancy in both directions such as illustrated in U.S. Pat. No. 5,252,386. Balanced tension is achieved through the steps of stretching the web in a cross machine direction while wet with the fire retardant bath and drying the web under tension in the cross direction. Another example of a nonwoven fabric construction having comparable strength in the machine direction and in the cross direction is illustrated at U.S. Pat. No. 5,286,289 wherein spot bonds are distributed in a cornrow pattern.

Accordingly, an important object of the invention is the provision of a relatively light fabric having improved tensile strength characteristics in both the machine direction and in the cross direction when compared to nonwoven fabrics presently utilized for hospital purposes such as gowns.

Another important object of the invention is the provision of nonwoven fabrics manufactured by a hydroentanglement process which utilizes web-forming techniques which result in comparable tensile strengths in both the machine direction and in the cross direction.

Another important object of the invention is the provision of a composite nonwoven fabric by a hydroentanglement process wherein wood fibers are incorporated into a web having increased tensile strength in both the machine direction and the cross direction to provide absorbency, drape and hand which makes the fabric suitable for hospital use and for fabrication into hospital gowns and the like.

SUMMARY OF THE INVENTION

It has been found that suitable strength characteristics may be imparted to a relatively light web which is constructed of synthetic fibers such as polyester or other polymeric material wherein the fibers are first carded and then subjected to the action of a cross lapper in order to orient fibers predominately in a cross direction. Thus, beginning with the carded web and the fibers oriented in the cross direction by cross lapping, the web is then drafted on the order of about 200% so as to reorient certain of the fibers in a machine direction to impart strength in that direction also.

Then, by utilizing a hydroentanglement step the drafted web may be formed into a fabric possessing comparable tensile strengths in the machine and cross directions. By entangling wood fibers from a superimposed paper web during hydroentanglement it is possible to produce a nonwoven fabric having suitable absorbency, drape and hand for hospital use.

It is preferred that the drafting step be accomplished by means of a web drafter having a series of rolls, wound with suitable wire card clothing and the like, rotating at progressively increasingly speeds as the web passes through the web drafter. By adjusting the degree of drafting the orientation of the fibers may be controlled thus determining the strength characteristics of the resulting fabrics. Preferably the fabric contains about 40% polyester by weight and a layer containing substantially unbonded wood fibers is applied on top thereof and then subjected to the hydroentanglement process. The wood fibers constitute substantially the entire remaining 60% of the fabric. The hydroentanglement process preferably includes a series of two spunlacing steps in order to sufficiently entangle the wood fibers with those of the polyester drafted web in order to control the final characteristics of the fabric.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a schematic longitudinal sectional elevation illustrating the cross-lapped web passing through a web drafter preparatory to the application of the wood fiber;

FIG. 3 is a longitudinal sectional elevation schematically illustrating the application of wood fibers to the drafted webbing preparatory to a first of the spunlacing steps.

DESCRIPTION OF A PREFERRED EMBODIMENT

The method of making the nonwoven fabric in accordance with the invention includes subjecting a web of fibers which have been opened and blended to suitable additional web forming apparatus preferably including one or more carding machines, illustrated at A. Fibers of the carded web are then oriented predominately in a cross direction as by the action of a cross lapper B. The cross-lapped web is then drafted to turn fibers from the cross direction toward a machine direction in the drafted web as by the wire wound rolls of a web drafter C. A web consisting essentially of unbonded paper pulp fibers is layed from a roll D in superimposed relation to the drafted web. The drafted web with the wood fibers in superposed relation is then hydroentangled preferably by suitable spunlacing apparatus E so that the paper pulp fibers and said fibers of the drafted web form a composite web. Thus, the composite web has strength in the cross direction in predetermined relation to strength in the machine direction.

Figure 1:
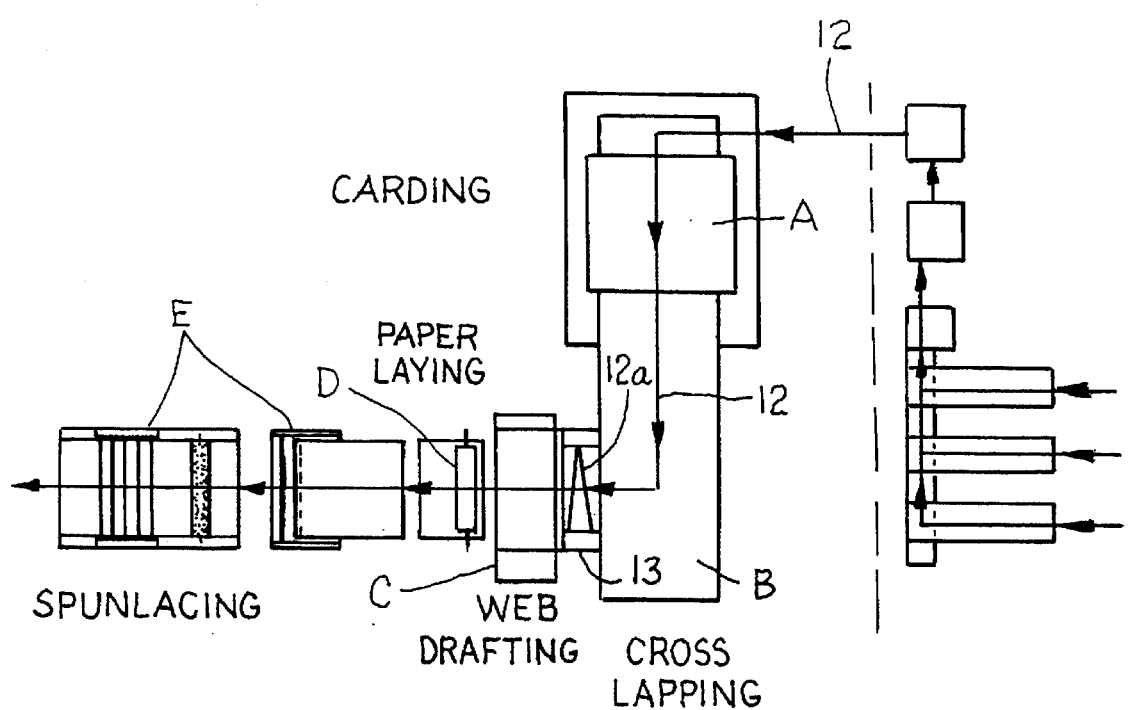
FIG. 1 is a block diagram illustrating the steps in web formation including carding and cross lapping together with the application of a paper web thereto with successive spunlacing steps in accordance with the invention.
Figure 1A:
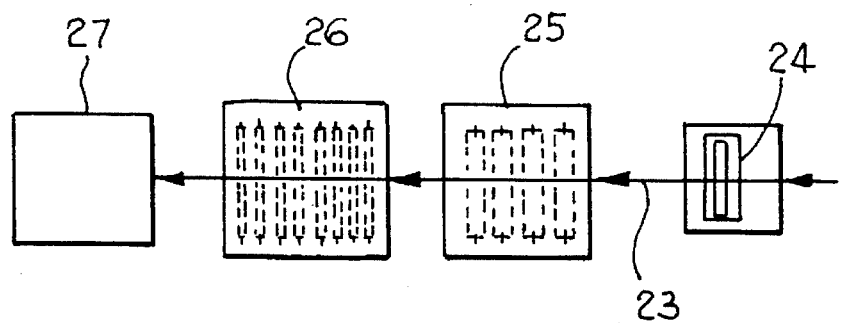
FIG. 1A is a block diagram illustrating further steps in the manufacture of the nonwoven fabric through batching of the finished fabric.

The block diagrams of FIGS. 1 and 1A illustrate schematically the method of making the nonwoven fabric. Fibers such as polyester are opened at 10 and blended at 11 forming a fibrous web 12. The web is then subjected to the action of one or more carding machines A from whence the web passes to a cross lapper B.

Cross lapper Type 6,431 by Hergeth Hollingsworth of D-4408 Dulmen/Werstf. has been found to produce a satisfactory cross-lapped web. The web 12 layed in cross laps 12a is illustrated in FIG. 1 as being delivered on the outlet apron 13 of the cross lapper to a web drafter C. Web Drafter Type 6.455 also by Hergeth Hollingsworth has been found to produce a satisfactory drafted web.

FIG. 2 illustrates the passage of the cross laps 12a of the web 12 to rolls of the web drafter C. The web 12 passes between the lower rolls 14 and upper rolls 15 each of which is wound with wire card clothing as at 14a and 15a, respectively. The speed of the rolls is progressively increased so that the web 12 becomes attenuated during its passage therethrough. Such drafting turns fibers toward the machine direction. The speed of the rolls may be adjusted to vary the amount of drafting and the degree of fiber reorientation. The web of drafted fiber is illustrated at 12b exiting on the apron 16 of the web drafter preparatory to the laying on of wood fibers.

A paper let-off is illustrated in FIG. 3 as including a paper roll D for feeding a paper web 17 beneath a guide roll 18. The web 17 is illustrated as being layed in superimposed relation over the cross-lapped web 12b which is carried on a conveyor 19. The webs 17 and 12b are then carried upon a steel belt 20 beneath a water box 21 which delivers a water jet or column 22 downwardly upon the webs 17 and 12b producing a composite fabric 23. The water box 21 is illustrated as being a part of the first of the spunlacing steps schematically illustrated in FIG. 1A.

Spunlacing is a form of hydroentangling or hydro-mechanical bonding of fibers which have normally been produced by a card or other equipment. High pressure water is generated and distributed by boxes carrying strips with very fine holes in them. The water is formed into fine high pressure columns by passing through the strips. At this point, the web is carried underneath the high pressure columns on a steel belt. Entangling of the fibers is controlled by strip hold size, water pressure, fiber type and density along with production rate. The weight range of web $M^2$ is normally from about 0.75 oz to about 3.5 oz with production rate from about 30 to about 100 m/p/m.

Referring to FIG. 1A, a padder is illustrated at 24 for applying suitable liquid treatment such as compositions for imparting fire retardant properties, fluorochemical repellents, anti-static agents, paraffin wax and the like. The composite web 23 is carried thence to a first set of drying cans 25 and thence to a second set of drying cans 23 to prepare the fabric for batching as at 27.

Thus, the process contemplates the following steps:
1. The cross-lapped web is drafted about 200%.
2. Inject into the web a pulp.
3. Use in the spunlacing, single row injector strips in order to increase water flow so as to sit the pulp in the web.
4. Exhaust water to approximately 130% of web/pulp weight.
5. Formulate a new mix system in order to apply wet on wet.

Figure 4:
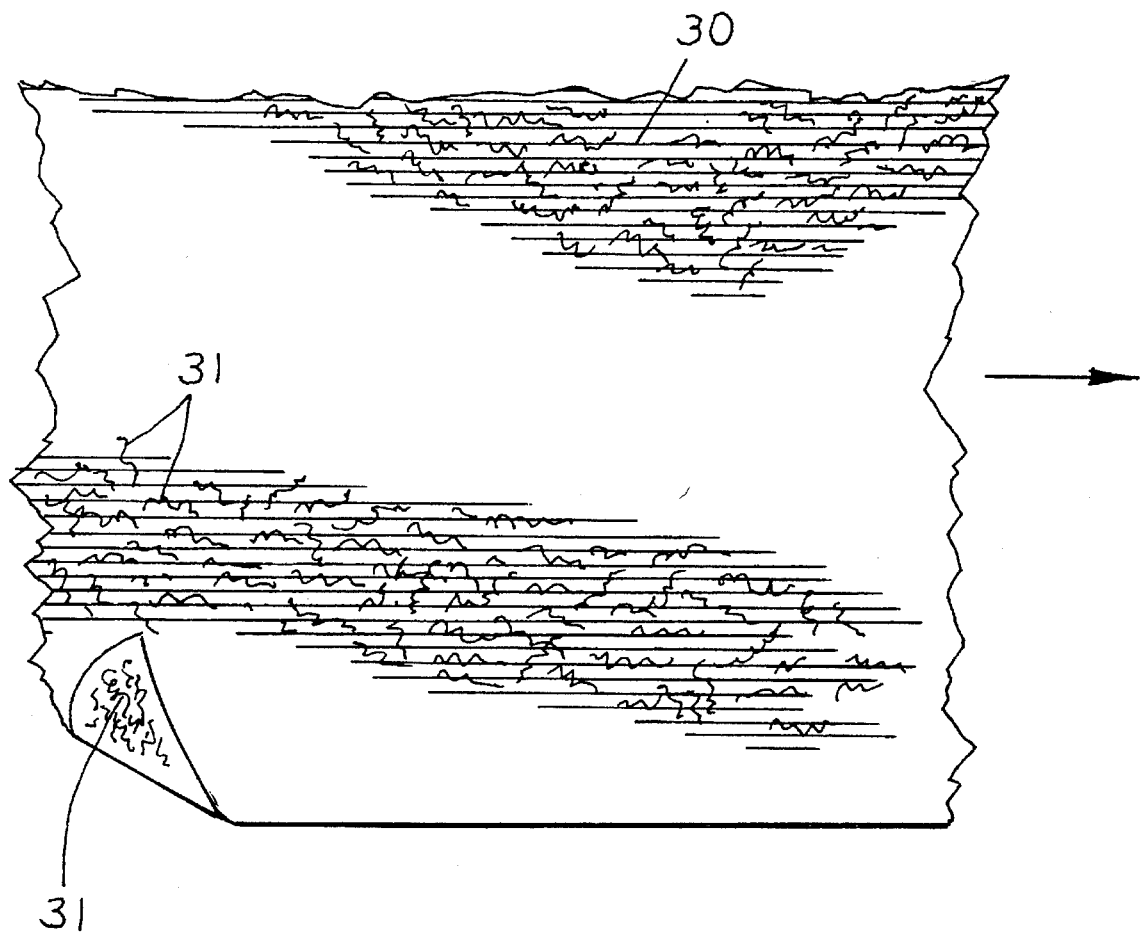
FIG. 4 is a plan view illustrating fabric constructed in accordance with the invention.

A preferred composition of gown fabric is as follows:
   55% Wood Pulp Western Cedar/38 gsm
   40% Polyester 1.5 dtex, 51 mm
   5% Finishing Treatment Fluorochemical Repellents, Anti-Static/Flame Retardant Agent, Paraffin Wax
   Fabric Area Weight=70 gsm FIG. 4 illustrates a fabric constructed in accordance with the invention wherein continuous rows 30 are formed in the machine direction by the action of the high pressure water columns of the spunlacing steps while the fibers 31 are oriented to provide comparable machine and cross directional tensile strengths.

Various characteristics of an example of gown fabric constructed in accordance with the invention is contained in the following table:

| TEST PARAMETER | TRIAL SAMPLE |
| --- | --- |
| WEIGHT (oz/sq.yd) | 2.17 |
| GRAB TENSILE M.D. (lbs/in) | 29.7 |
| GRAB TENSILE X.D. (lbs/in) | 23.4 |
| HYDROSTATIC HEAD (cm) | 24.0 |
| AIR PERMEABILITY (cfm) | 51.0 |
| ALCOHOL REPELLENCY ETHANOL (rating) | 7 (15 min) |
| ALCOHOL REPELLENCY IPA (rating) | 7 (15 min) |
| FLAMMABILITY (s) | 5.0 |
| MASON JAR (min) | >60 |
| SPRAY RATING (rating) | 80 |
| BLOOD STRIKE THROUGH (%) | 54.0 |

While a preferred embodiment of the invention has been described using specific terms, such description is for illustrative purposes only, and it is to be understood that changes and variations may be made without departing from the spirit or scope of the following claims.

What is claimed is:

1. The method of making a nonwoven fabric comprising the steps of:
   cross lapping a carded web so that the fibers of the cross-lapped web are oriented predominately in a cross direction;
   drafting said cross-lapped web so as to turn the fibers from said cross direction toward a machine direction in the drafted web;
   laying a web consisting essentially of unbonded paper pulp fibers in superimposed relation to said drafted web; and
   then hydroentangling said paper pulp fibers with said fibers of the drafted web forming a composite web;
   whereby said composite web has a predetermined strength in the machine direction in relation to strength in the cross direction.

2. The method set forth in claim 1 wherein the fibers of the cross-lapped, drafted web are polyester, and wherein hydroentangling includes successive spunlacing steps.

3. The method set forth in claim 1 wherein said drafting step includes subjecting the cross-lapped carded web to the action of wire wound rolls the speed of which is increased progressively to produce a fiber wherein strength in the machine direction is comparable to strength in the cross direction.

4. The method set forth in claim 1 wherein said hydroentangling step includes successive spunlacing steps.

5. A composite hydroentangled fabric useful in surgical gowns having strength in the machine direction in a predetermined relation to strength in the cross direction comprising:

a cross-lapped carded web of polymeric fibers drafted so that fibers are reoriented toward a machine direction;

a web of paper pulp fibers layed in superimposed relation to the reoriented fibers of the carded and drafted web and then hydroentangled therewith forming a composite fabric; and said composite fabric possessing comparable strength in the machine direction and in the cross direction as to facilitate the sewing of sleeves into gowns of the same material while possessing suitable absorbency, drape and hand.

6. The method of making a nonwoven fabric comprising the steps of:

cross lapping a carded web constructed of polymeric fibers so that the polymeric fibers of the cross-lapped web are oriented predominately in a cross direction;

drafting said cross-lapped web so as to turn the fibers from said cross direction toward a machine direction in the drafted web; and bonding the fibers of the carded, cross-lapped web by hydroentangling the polymeric fibers forming a fabric having a predetermined strength in the machine direction comparable to strength in the cross direction.

7. The method set forth in claim 6 wherein said polymeric fibers are polyester fibers drafted upon a series of wire wound rolls of progressively increasing speed, and wherein said web of polymeric fibers and said web of paper pulp fibers are hydroentangled by the action of successive spunlacing steps.

* * * * *